US012734479B2

(12) United States Patent
Nishimura et al.

(10) Patent No.: US 12,734,479 B2
(45) Date of Patent: Sep. 15, 2026

(54) ADSORPTION DRYER AND METHOD FOR OPERATING ADSORPTION DRYER

(71) Applicant: KOBELCO COMPRESSORS CORPORATION, Tokyo (JP)

(72) Inventors: Hiroaki Nishimura, Kako-gun (JP); Kiyonori Izutani, Kako-gun (JP)

(73) Assignee: KOBELCO COMPRESSORS CORPORATION, Tokyo (JP)

( * ) Notice: Subject to any disclaimer, the term of this patent is extended or adjusted under 35 U.S.C. 154(b) by 335 days.

(21) Appl. No.: 18/559,636

(22) PCT Filed: May 9, 2022

(86) PCT No.: PCT/JP2022/019702
§ 371 (c)(1),
(2) Date: Nov. 8, 2023

(87) PCT Pub. No.: WO2022/244641
PCT Pub. Date: Nov. 24, 2022

(65) Prior Publication Data

US 2024/0226804 A1 Jul. 11, 2024

(30) Foreign Application Priority Data

May 18, 2021 (JP) ................................. 2021-084042

(51) Int. Cl.
*B01D 53/26* (2006.01)
*B01D 53/06* (2006.01)
(Continued)

(52) U.S. Cl.
CPC .......... *B01D 53/261* (2013.01); *F04B 39/123* (2013.01); *F04B 39/16* (2013.01); *F05B 2210/12* (2013.01)

(58) Field of Classification Search
CPC ........ B01D 53/04; B01D 53/06; B01D 53/26; B01D 53/261; F04B 39/123; F04B 39/16; F05B 2210/12
(Continued)

(56) References Cited

U.S. PATENT DOCUMENTS 3,807,053 A 4/1974 Sylvan et al.
5,242,473 A * 9/1993 Ogasahara ............. B01D 53/06 96/125

(Continued)

FOREIGN PATENT DOCUMENTS

CN 1993168 A 7/2007
JP H06-031131 A 2/1994
JP 2011-115789 A 6/2011

OTHER PUBLICATIONS

Notification of Transmittal of Translation of the International Preliminary Report on Patentability and Translation of Written Opinion of the International Searching Authority; PCT/JP2022/019702; mailed on Nov. 30, 2023.
International Search Report issued in PCT/JP2022/019702; mailed Jul. 12, 2022.

*Primary Examiner* — Frank M Lawrence, Jr.
(74) *Attorney, Agent, or Firm* — Studebaker Brackett PLLC

(57) ABSTRACT

A dryer includes a rotary adsorption rotor, a casing that rotatably supports the adsorption rotor and is petitioned into a first zone, a second zone, and a third zone, a first zone inlet flow path that supplies compressed air to the first zone, a first zone outlet flow path that supplies dry compressed air from the first zone to the consumer facility side, a third zone inlet flow path that supplies cooling gas to the third zone, a third zone outlet flow path that discharges cooling gas from the third zone, a second zone inlet flow path that supplies regeneration gas to the second zone, and a second zone outlet flow path that discharges regeneration gas from the (Continued)

second zone. The third zone inlet flow path supplies a part of the compressed air having flowed through the first zone as a cooling gas.

5 Claims, 10 Drawing Sheets

(51) Int. Cl.
*F04B 39/12* (2006.01)
*F04B 39/16* (2006.01)

(58) Field of Classification Search
USPC ..... 95/107, 113–115, 117, 121–125; 96/125, 96/126, 130, 143, 146; 34/80, 472, 473
See application file for complete search history.

(56) References Cited

U.S. PATENT DOCUMENTS

| | | | | |
|---|---|---|---|---|
| 5,512,083 | A * | 4/1996 | Dunne | B01D 53/06 95/143 |
| 5,701,762 | A * | 12/1997 | Akamatsu | B01D 53/06 96/123 |
| 6,165,254 | A * | 12/2000 | Kawakami | B01D 53/06 96/125 |
| 2005/0217481 | A1* | 10/2005 | Dunne | B01D 53/261 95/113 |
| 2009/0007783 | A1 | 1/2009 | Vanderstraeten et al. | |
| 2011/0132191 | A1 | 6/2011 | Fredenhagen et al. | |
| 2019/0022574 | A1* | 1/2019 | Jin | B01D 53/06 |
| 2020/0070086 | A1* | 3/2020 | Inoue | B01D 53/28 |

* cited by examiner 17b (17)
15a
15b
A
22b
11
6
13
12
O1
21b
17c (17)
15c
14b
23b
17a (17)

17b
6
O1
15b
15a
15c
17c
17a
11
18b
A
16b
16a
18c
18a
16c

ADSORPTION DRYER AND METHOD FOR OPERATING ADSORPTION DRYER

CROSS-REFERENCE TO RELATED APPLICATIONS

This is a national phase application in the United States of International Patent Application No. PCT/JP2022/019702 with an international filing date of May 9, 2022, which claims priority of Japanese Patent Application No. 2021-084042 filed on May 18, 2021, the contents of which are incorporated herein by reference.

TECHNICAL FIELD

The present invention relates to an adsorption dryer and a method for operating the adsorption dryer.

BACKGROUND ART

An adsorption dryer that adsorbs and dries moisture from compressed air discharged from an oil-free compressor is known. For example, an adsorption dryer described in JP H06-031131 A includes a rotary adsorption rotor including an adsorption medium, and a casing that is formed in a cylindrical shape and rotatably supports the adsorption rotor accommodated concentrically, and the inside of the casing is partitioned about a central axis into a treatment zone, a regeneration zone, and a cooling zone each extending in the axial direction.

The compressed air discharged from the oil-free compressor is cooled by the after cooler and then supplied to the treatment zone in the adsorption dryer, moisture is adsorbed (hereinafter also referred to as "dehumidified") by a portion of the adsorption rotor located in the treatment zone, and then the compressed air is supplied to the consumer side as dried compressed air (hereinafter referred to as "dry compressed air").

A part of the compressed air before being supplied to the after cooler is divided and supplied to the regeneration zone. That is, since the high-temperature compressed air is supplied as the regeneration gas to the portion of the adsorption rotor located in the regeneration zone, the moisture adsorbed to the portion is released to the high-temperature compressed air having a relatively low relative humidity. As a result, moisture is removed from the adsorption rotor and the adsorption rotor is regenerated.

A part of the compressed air passing through the after cooler and before being supplied to the treatment zone is divided and supplied to the cooling zone. That is, since the cooled compressed air is supplied as the cooling gas to the portion of the adsorption rotor located in the cooling zone, the drying capacity is restored by cooling the adsorption medium located in the portion.

Generally, when the oil-free compressor is in a load operation state, the adsorption type rotor rotates at a low speed (for example, 6 rph) in the casing, and each part of the adsorption type rotor sequentially performs moisture adsorption from the compressed air in the treatment zone, removal of adsorbed moisture in the regeneration zone, and cooling of the adsorption medium in the cooling zone while moving through the treatment zone, the regeneration zone, and the cooling zone in the casing in a predetermined order. As a result, the dry compressed air is continuously supplied from the adsorption dryer to the consumer facility side.

SUMMARY OF THE INVENTION

In the adsorption dryer of JP H06-031131 A, compressed air before being supplied to the treatment zone, that is, with no absorption of moisture, is supplied to the cooling zone as a cooling gas. For this reason, in the cooling zone, the dryness of the adsorption rotor is deteriorated by the undried compressed air, and as a result, the drying performance of the adsorption rotor in the treatment zone is easily deteriorated.

An object of the present invention is to reduce deterioration of drying performance due to cooling of an adsorption rotor in an adsorption rotor provided in an adsorption dryer that dries compressed air discharged from an oil-free compressor and that adsorbs, regenerates, and cools moisture from compressed air.

The present invention provides an adsorption dryer including:

- a rotary adsorption rotor that is formed in a columnar shape, has a plurality of rotor flow paths penetrating in an axial direction, and includes an adsorption medium on a wall surface constituting each of the plurality of rotor flow paths;
- a casing that is formed in a cylindrical shape, rotatably supports the adsorption rotor concentrically accommodated, and has an inside partitioned about a central axis into a treatment zone, a regeneration zone, and a cooling zone, each extending in an axial direction;
- a treatment zone inlet flow path supplying compressed air to the treatment zone;
- a treatment zone outlet flow path for supplying the compressed air having flowed through the rotor flow path of the treatment zone to a consumer side;
- a cooling zone inlet flow path for supplying to the cooling zone a cooling gas for cooling the adsorption rotor;
- a cooling zone outlet flow path for discharging the cooling gas having flowed through the rotor flow path in the cooling zone;
- a regeneration zone inlet flow path for supplying regeneration gas for regenerating the adsorption rotor to the regeneration zone; and
- a regeneration zone outlet flow path for discharging the regeneration gas having flowed through the rotor flow path in the regeneration zone from the casing, in which
- the cooling zone inlet flow path supplies a part of the compressed air having flowed through the rotor flow path of the treatment zone as the cooling gas.

According to the present invention, a part of the compressed air of which moisture has been adsorbed by the adsorption medium of the adsorption rotor in the treatment zone is supplied to the cooling zone as the cooling gas. As a result, as compared with a case where compressed air containing a large amount of moisture is supplied to the cooling zone, adhesion of moisture from the compressed air to the adsorption rotor is reduced, so that deterioration of drying performance of the adsorption rotor due to cooling can be reduced. Therefore, it is possible to reduce deterioration of the drying performance of the adsorption rotor and to continuously and stably supply the dried compressed air to the consumer side.

The adsorption dryer may further include: an outlet valve that is provided in the treatment zone outlet flow path and opens and closes the treatment zone outlet flow path; and a check valve that is provided in the treatment zone inlet flow path, and allows a flow of compressed air only in a direction toward the treatment zone via the treatment zone inlet flow path, in which

- the regeneration zone inlet flow path has a one end portion branched from a portion of the treatment zone inlet flow path closer to the treatment zone with respect to the check valve, the regeneration zone outlet flow path joins a portion of the treatment zone inlet flow path located closer to the treatment zone with respect to the one end portion of the regeneration zone inlet flow path, the cooling gas having flowed through the cooling zone joins the regeneration gas having flowed through the regeneration zone, an atmosphere release flow path is connected to the regeneration zone outlet flow path on a side closer to one end portion joining the treatment zone inlet flow path with respect to a position where the cooling gas joins the regeneration zone outlet flow path, and the atmosphere release flow path is provided in the middle thereof with an atmosphere valve that has a distal end opened to the atmosphere, and that opens and closes the atmosphere release flow path.

According to this configuration, when the compressor is in no-load operation, by opening the atmosphere release valve, the compressed air, the cooling gas, and the regeneration gas in the casing can be easily discharged from the casing via the atmosphere release flow path using the pressure difference between the internal pressure of the casing and the atmospheric pressure. Specifically, the compressed air retained in the treatment zone flows to the cooling zone via the cooling zone inlet flow path, and the cooling gas in the cooling zone and the regeneration gas in the regeneration zone are discharged from the casing to the atmosphere release flow path side.

As a result, leakage of the compressed air retained in the casing, particularly the regeneration gas retained in the regeneration zone, to other zones is reduced, and deterioration of the dew point due to cooling of the compressed air retained in the casing is reduced, so that supply of the compressed air having a deteriorated dew point to the consumer side when switching to the load operation is suppressed. In the present specification, the statement "dew point is deteriorated" means "(not dried and) relative humidity is high".

In addition, the adsorption dryer may further include:

a first scavenging flow path connecting a portion of the treatment zone outlet flow path located closer to the consumer side with respect to the outlet valve and the regeneration zone inlet flow path; and a first scavenging valve that is provided in the first scavenging flow path and opens and closes the first scavenging flow path.

According to this configuration, when the compressor is in no-load operation, by opening the first scavenging valve after opening the atmosphere release valve, the dried compressed air from the consumer side is supplied from the upstream side with respect to the regeneration zone via the first scavenging flow path, and the regeneration gas can be scavenged from the regeneration zone to replace the regeneration zone with the dried compressed air.

As a result, the deterioration of the dew point due to the cooling of the regeneration gas retained in the regeneration zone is reduced, so that the adhesion of moisture to the adsorption rotor in the regeneration zone is reduced when the operation is switched to the load operation, and the supply of compressed air having a deteriorated dew point to the consumer side is suppressed.

In addition, the adsorption dryer may further include:

a second scavenging flow path connecting a portion of the treatment zone outlet flow path located closer to the consumer side with respect to the outlet valve and the treatment zone inlet flow path; and a second scavenging valve that is provided in the second scavenging flow path and opens and closes the second scavenging flow path.

According to this configuration, when the compressor is in no-load operation, by closing the outlet valve, opening the atmosphere release valve, and further opening the second scavenging valve, the dried compressed air from the consumer side is supplied from the upstream side to the treatment zone via the second scavenging flow path, and the treatment zone and the cooling zone are sequentially scavenged, so that the treatment zone and the cooling zone can be replaced with the dried compressed air.

As a result, deterioration of the dew point due to cooling of the compressed air retained in the treatment zone and the cooling zone is reduced, so that adhesion of moisture to the adsorption rotor in the treatment zone and the cooling zone is reduced when switching to the load operation is performed, and supply of the compressed air having a deteriorated dew point to the consumer side is suppressed.

In addition, the adsorption dryer may further include a pressurization device that is provided in the treatment zone inlet flow path and pressurizes the compressed air flowing through the treatment zone inlet flow path.

According to this configuration, the pressure of the compressed air in the treatment zone can be increased more than the pressure of the regeneration gas in the regeneration zone, whereby leakage of the regeneration gas in the regeneration zone into the treatment zone in the upstream and downstream regions of the adsorption rotor in the casing is suppressed. As a result, it is possible to reduce deterioration of drying performance due to leakage of the regeneration gas containing a large amount of moisture to the treatment zone.

Another aspect of the present invention provides a method for operating an adsorption dryer that dries compressed air compressed by a compressor and supplies the air to a consumer side, including during load operation of the compressor, while rotating an adsorption rotor concentrically in a cylindrical casing having a treatment zone, a cooling zone, and a regeneration zone that are circumferentially partitioned, carrying out in parallel:

adsorbing, in the treatment zone, moisture from compressed air supplied in an axial direction by a portion of the adsorption rotor located in the treatment zone and supplying compressed air to a consumer side;

cooling, in the cooling zone, a portion of the adsorption rotor located in the cooling zone by a cooling gas supplied in the axial direction; and regenerating, in the regeneration zone, a portion of the adsorption rotor located in the regeneration zone by regeneration gas supplied in the axial direction, and supplying a part of the compressed air of which moisture has been adsorbed by the adsorption rotor in the treatment zone to the cooling zone as the cooling gas.

In addition, during no-load operation of the compressor, while the supply of the dried compressed air to the consumer side is blocked by an outlet valve and the cooling gas discharged from the cooling zone and the regeneration gas discharged from the regeneration zone are opened to the atmosphere, respectively, simultaneously with or after the blocking, at least one of supplying the dried compressed air from the consumer side of the outlet valve to an upstream side of the treatment zone and supplying the dried compressed air from the consumer side of the outlet valve to an upstream side of the regeneration zone may be performed.

According to the present invention, the adsorption rotor is supplied with the compressed air dried by the adsorption rotor adsorbing moisture in the treatment zone to a portion located in the cooling zone in the casing, so that deterioration of drying performance of the adsorption rotor due to cooling is reduced.

DETAILED DESCRIPTION

Hereinafter, a compressed air supply system according to an embodiment of the present invention will be described with reference to the accompanying drawings.

Figure 1:
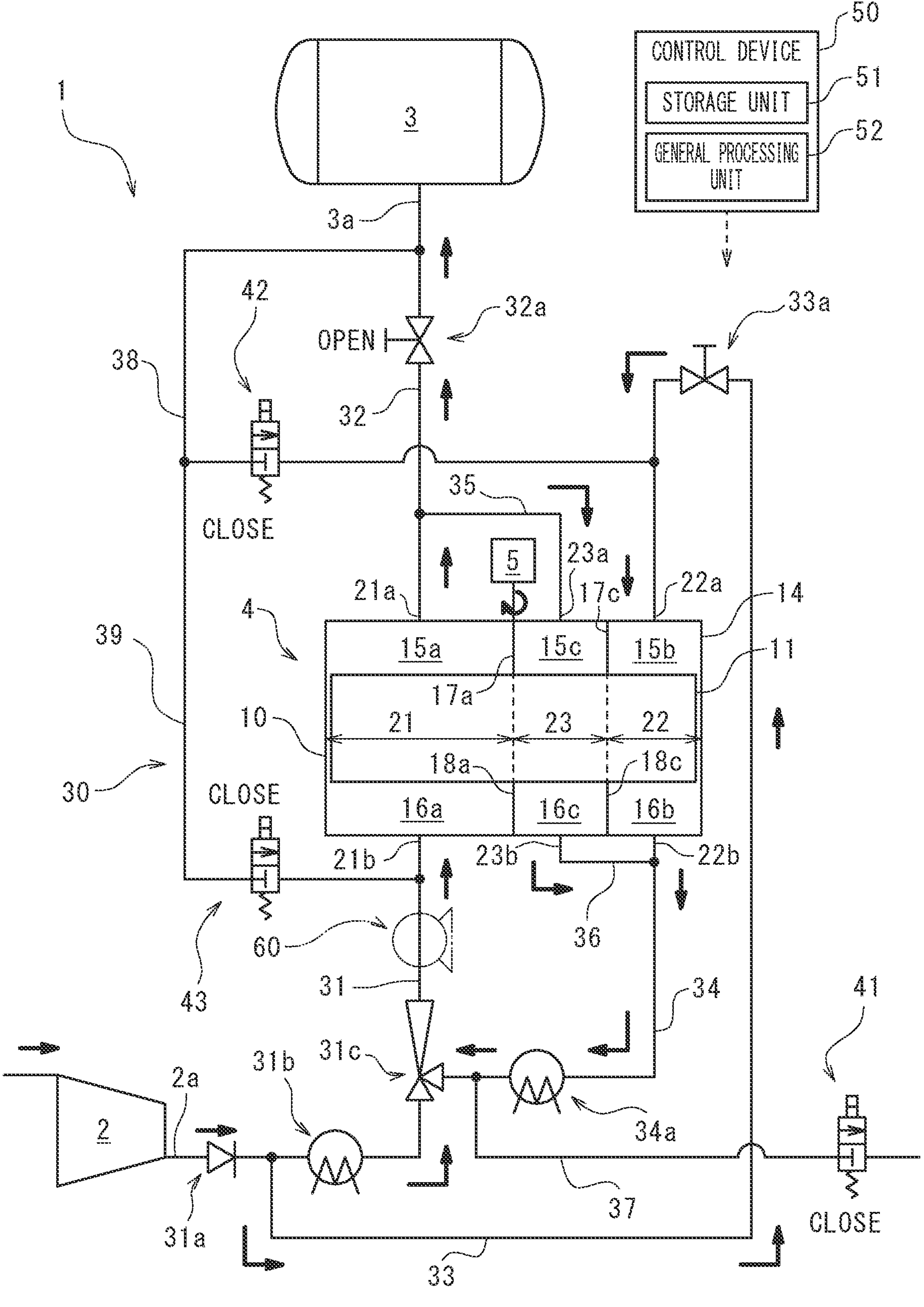
FIG. 1 is a configuration diagram schematically illustrating a compressed air supply system according to an embodiment of the present invention.

FIG. 1 schematically illustrates a compressed air supply system 1 according to an embodiment of the present invention. As illustrated in FIG. 1, a compressed air supply system 1 includes a compressor 2 that discharges compressed air, and a dryer 4 that dries the discharged compressed air and supplies the dried compressed air to a consumer facility 3. The compressor 2 is an oil-free screw rotary machine that compresses and discharges air by a pair of screw rotors (not illustrated).

The dryer 4 is an adsorption dryer that adsorbs moisture from the compressed air to dry the compressed air. The dryer 4 includes a dryer main body 10 that adsorbs moisture from the compressed air, a flow path 30 that connects the dryer main body 10 to the compressor 2 and to the consumer facility 3, and a control device 50 that controls the operation of the dryer 4.

Figure 2:
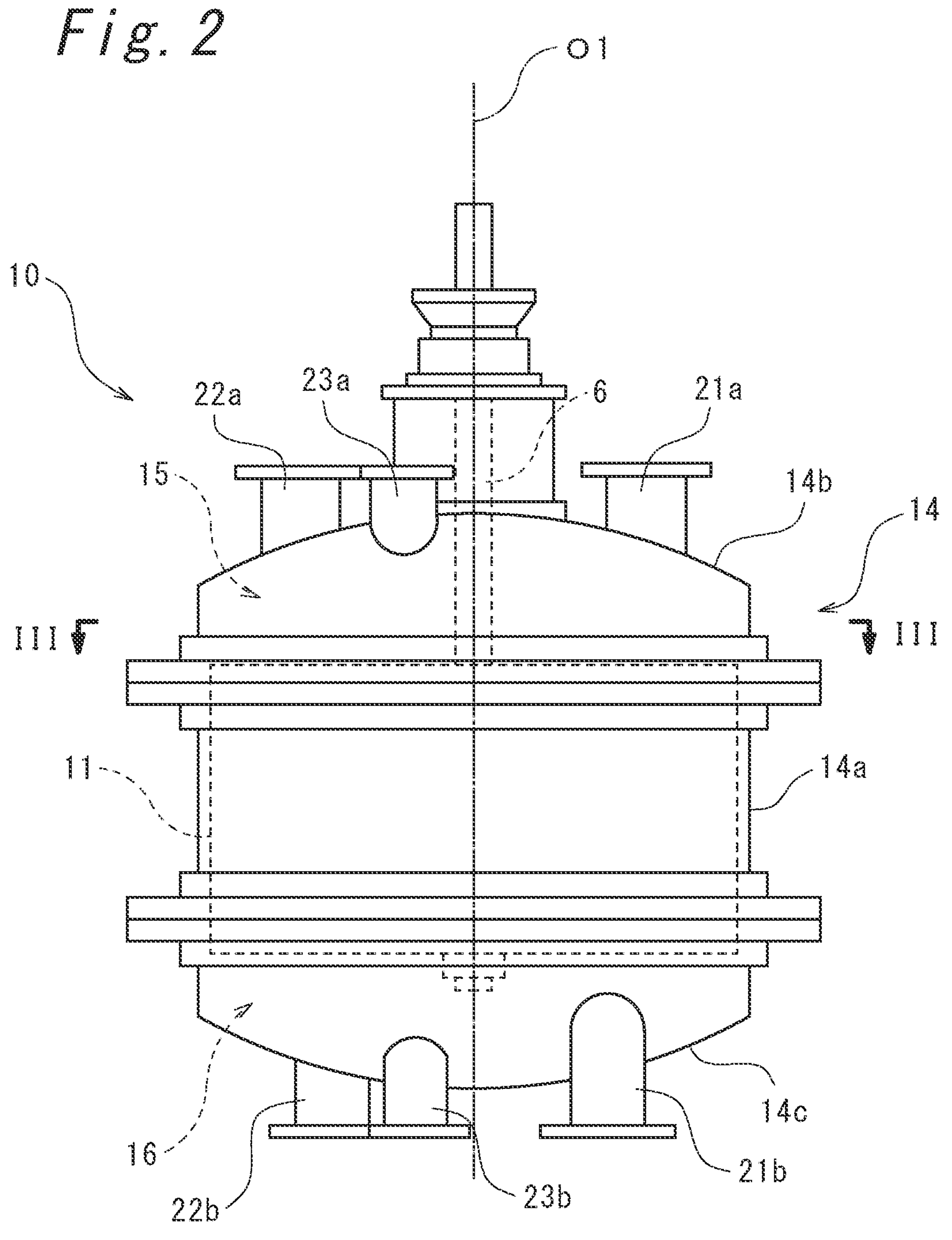
FIG. 2 is a front view of an adsorption dryer.

The dryer main body 10 will be described with reference to FIGS. 2 to 4. FIG. 2 is a front view of the dryer main body 10. As illustrated in FIG. 2, the dryer main body 10 includes a rotary adsorption rotor 11 and a casing 14 that is formed in a cylindrical shape and rotatably supports the adsorption rotor 11 accommodated concentrically. The dryer main body 10 is a vertical dryer in which the central axis O1 of the adsorption rotor 11 extends in the vertical direction.

The adsorption rotor 11 is formed in a columnar shape, has a large number of fine rotor flow paths 12 (see FIG. 3) penetrating in the axial direction, and includes an adsorption medium 13 (see FIG. 3) on a wall surface constituting the rotor flow path 12. For example, the adsorption rotor 11 can be made of a material having a honeycomb structure in which an adsorption medium 13 such as silica gel is chemically synthesized with ceramic. The adsorption rotor 11 is supported by a shaft 6 coupled to an output shaft of a motor 5 (see FIG. 1), and is rotationally driven by the motor 5 in a direction indicated by an arrow A in FIG. 3.

The casing 14 includes a cylindrical portion **14*a* having an inner diameter substantially equal to the outer diameter of the adsorption rotor 11, a lid portion 14*b* that closes an upper portion of the cylindrical portion 14*a*, and a bottom portion 14*c* that closes a lower portion of the cylindrical portion 14*a*. The lid portion 14*b* forms an upper closed space 15 with respect to the upper end surface of the adsorption rotor 11. The bottom portion 14*c* forms a lower closed space 16 with respect to the lower end surface of the adsorption rotor 11**.

Figure 3:
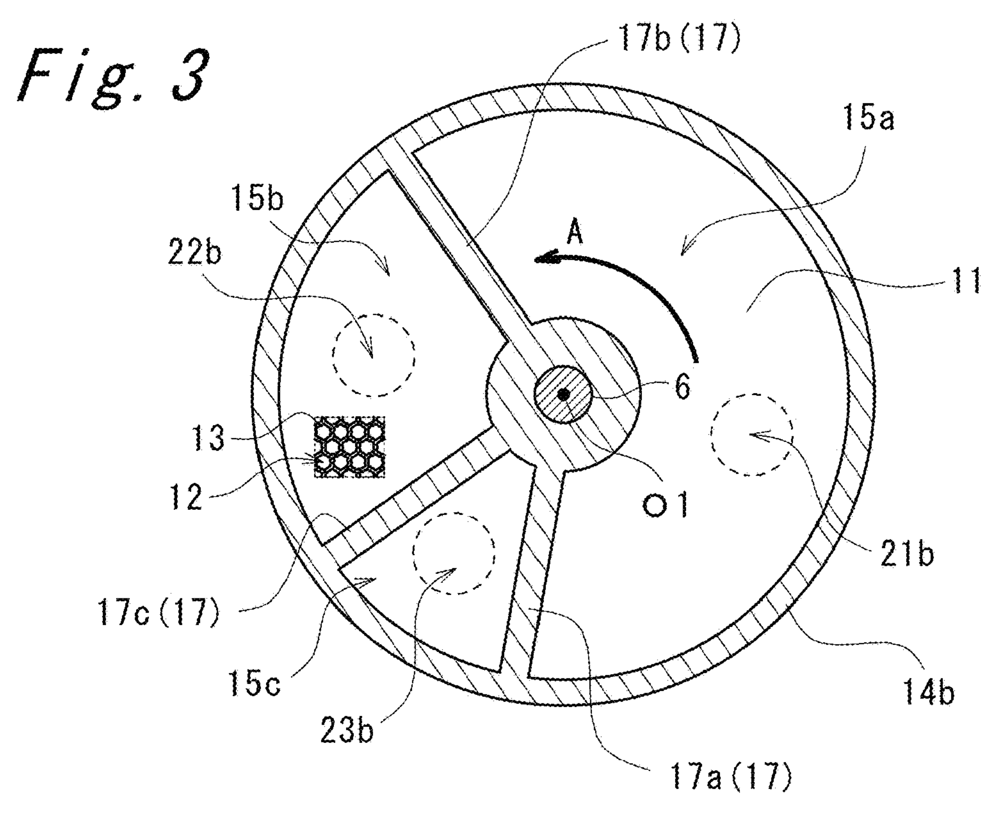
FIG. 3 is a cross-sectional view taken along line III-III of FIG. 2.

FIG. 3 is a horizontal cross-sectional view of the upper closed space 15 taken along line III-III in FIG. 2. As illustrated in FIG. 3, a plurality of partition walls 17 extending radially inward and partitioning the upper closed space 15 about the central axis O1 are formed in the lid portion **14*b*. The plurality of partition walls 17 include a first partition wall 17*a*, a second partition wall 17*b*, and a third partition wall 17*c*. In the upper closed space 15, an upper first closed space 15*a* is defined between the first partition wall 17*a* and the second partition wall 17*b*, an upper second closed space 15*b* is defined between the second partition wall 17*b* and the third partition wall 17*c*, and an upper third closed space 15*c* is defined between the third partition wall 17*c* and the first partition wall 17*a*. The upper first closed space 15*a*, the upper second closed space 15*b*, and the upper third closed space 15*c*** are arranged in this order along the rotation direction A.

Figure 4:
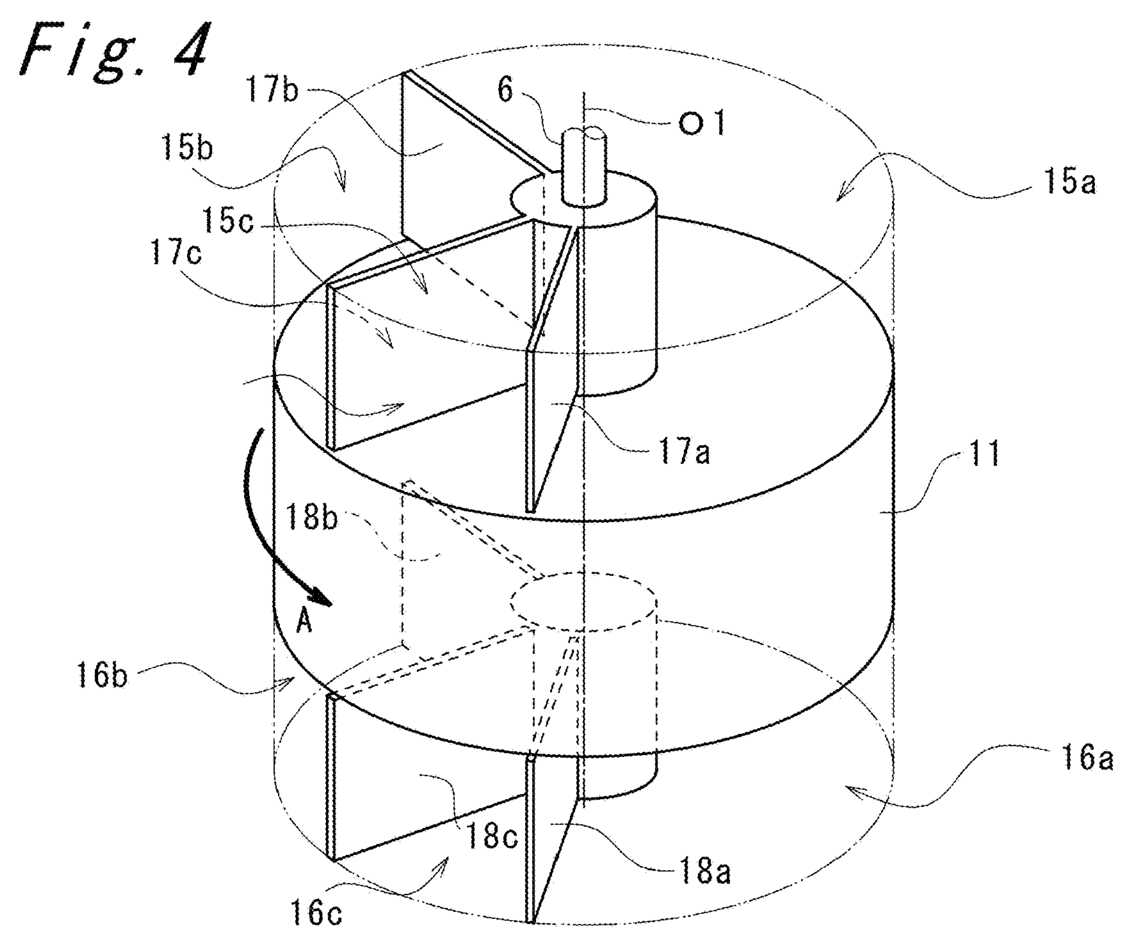
FIG. 4 is a perspective view schematically showing a flow path in a casing of the adsorption dryer.

FIG. 4 is a perspective view schematically showing a flow path in the casing 14. As illustrated in FIG. 1, a plurality of partition walls 18 extending radially inward is similarly formed in the lower closed space 16. The plurality of partition walls 18 include a first partition wall **18*a*, a second partition wall 18*b*, and a third partition wall 18*c*. In the lower closed space 16, a lower first closed space 16*a* is defined between the first partition wall 18*a* and the second partition wall 18*b*, a lower second closed space 16*b* is defined between the second partition wall 18*b* and the third partition wall 18*c*, and a lower third closed space 16*c* is defined between the third partition wall 18*c* and the first partition wall 18*a*. The lower first closed space 16*a*, the lower second closed space 16*b*, and the lower third closed space 16*c*** are arranged in this order along the rotation direction A.

The lower first closed space **16*a*, the lower second closed space 16*b*, and the lower third closed space 16*c* are located in the same circumferential range around the central axis O1 with respect to the upper first closed space 15*a*, the upper second closed space 15*b*, and the upper third closed space 15*c***, respectively.

Since the adsorption rotor 11 has the plurality of fine rotor flow paths 12 extending in the axial direction, in the casing 14, the first zone 21 is constituted by the upper first closed space **15*a*, the lower first closed space 16*a*, and the plurality of rotor flow paths 12 positioned between the upper and lower first closed spaces, the second zone 22 is constituted by the upper second closed space 15*b*, the lower second closed space 16*b*, and the plurality of rotor flow paths 12 positioned between the upper and lower second closed spaces, and the third zone 23 is constituted by the upper third closed space 15*c*, the lower third closed space 16*c*, and the plurality of rotor flow paths 12** positioned between the upper and lower third closed spaces.

That is, the inside of the casing 14 is partitioned about the central axis O1 so as to have the first zone 21, the second zone 22, and the third zone 23 extending in the axial direction. As will be described below, the first zone 21 is configured as a treatment zone according to the invention, the second zone 22 is configured as a regeneration zone according to the invention, and the third zone 23 is configured as a cooling zone according to the invention.

As shown in FIG. 2, the lid portion 14*b* is provided with a lid portion first connection port 21*a*, a lid portion second connection port 22*a*, and a lid portion third connection port 23*a* which communicate with the first to third zones 21 to 23, respectively, and are connected to the flow path 30. Similarly, the bottom portion 14*c* is also provided with a bottom portion first connection port 21*b*, a bottom portion second connection port 22*b*, and a bottom portion third connection port 23*b* that communicate with the first to third zones 21 to 23, respectively, and are connected to the flow path 30.

Next, the flow path 30 will be described with reference to FIG. 1. The flow path 30 includes a first zone inlet flow path (treatment zone inlet flow path) 31 connected to the bottom portion first connection port 21*b*, a first zone outlet flow path (treatment zone outlet flow path) 32 connected to the lid portion first connection port 21*a*, a second zone inlet flow path (regeneration zone inlet flow path) 33 connected to the lid portion second connection port 22*a*, a second zone outlet flow path (regeneration zone outlet flow path) 34 connected to the bottom portion second connection port 22*b*, a third zone inlet flow path (cooling zone inlet flow path) 35 connected to the lid portion third connection port 23*a*, and a third zone outlet flow path (cooling zone outlet flow path) 36 connected to the bottom portion third connection port 23*b*.

The first zone inlet flow path 31 connects the bottom portion first connection port 21*b* and the discharge port 2*a* of the compressor 2, and supplies the compressed air discharged from the compressor 2 to the first zone 21. The first zone inlet flow path 31 is provided with a check valve 31*a*, an after cooler 31*b*, and an air ejector 31*c* in order from the compressor 2 toward the first zone 21.

The check valve 31*a* allows the compressed air to flow only in the direction toward the first zone 21. The after cooler 31*b* is a heat exchanger and cools the compressed air discharged from the compressor 2. The air ejector 31*c* is configured such that a part constituting the flow path is an orifice, and the flow velocity of the compressed air toward the first zone 21 in the first zone inlet flow path 31 is increased at this part to reduce the pressure, thereby drawing the compressed air from the second zone outlet flow path 34 as described later.

The first zone outlet flow path 32 connects the lid portion first connection port 21*a* and the inlet 3*a* of the consumer facility 3, and supplies the dry compressed air to which moisture is adsorbed by the adsorption rotor 11 in the first zone 21 to the consumer facility 3.

The first zone outlet flow path 32 is provided with an outlet valve 32*a* configured to open and close the flow path. During the load operation of the compressed air supply system 1, the outlet valve 32*a* is opened, and the compressed air is supplied to the consumer facility 3. On the other hand, during no-load operation of the compressed air supply system 1, the outlet valve 32*a* is closed, the supply of the compressed air to the consumer facility 3 is blocked, and the flow of the compressed air in the flow path 30 is stopped.

The second zone inlet flow path 33 connects the middle of the first zone inlet flow path 31 and the lid portion second connection port 22*a*. Specifically, the second zone inlet flow path 33 branches from the first zone inlet flow path 31 between the check valve 31*a* and the after cooler 31*b*. The second zone inlet flow path 33 is provided with a regulating valve 33*a*.

The pressure and amount of compressed air diverted from the first zone inlet flow path 31 to the second zone inlet flow path 33 are adjusted by the regulating valve 33*a*. The regulating valve 33*a* is adjusted so that the pressure of the compressed air in the second zone 22 is lower than the pressure of the compressed air in the first zone 21. As a result, leakage of the compressed air from the second zone 22 to the first zone 21 through the vertical gap between the partition walls 17 and 18 and the adsorption rotor 11 is suppressed.

The second zone outlet flow path 34 connects the bottom portion second connection port 22*b* and the air ejector 31*c*. As described above, the compressed air discharged from the second zone 22 is introduced into the first zone inlet flow path 31 via the air ejector 31*c*. The second zone outlet flow path 34 is provided with a bypass cooler 34*a*. The bypass cooler 34*a* is a heat exchanger and cools the compressed air discharged from the second zone 22.

The third zone inlet flow path 35 connects the middle of the first zone outlet flow path 32 and the lid portion third connection port 23*a*. Specifically, the third zone inlet flow path 35 branches from a portion of the first zone outlet flow path 32 located closer to the first zone 21 than the outlet valve 32*a*. That is, a part of the compressed air discharged from the first zone 21 is diverted from the first zone outlet flow path 32 and introduced into the third zone inlet flow path 35.

The third zone outlet flow path 36 connects the middle of the second zone outlet flow path 34 and the bottom portion third connection port 23*b*. Specifically, the third zone outlet flow path 36 is connected to a portion of the second zone outlet flow path 34 located upstream with respect to the bypass cooler 34*a*.

In the compressed air supply system 1 according to the present embodiment, the flow path 30 further includes the atmosphere release flow path 37, the first scavenging flow path 38, and the second scavenging flow path 39.

The atmosphere release flow path 37 has one end connected to the middle of the second zone outlet flow path 34 and the other end opened to the atmosphere. Specifically, the atmosphere release flow path 37 branches from a portion of the second zone outlet flow path 24 between the air ejector 31*c* and the bypass cooler 34*a*. The atmosphere release flow path 37 is provided with an atmosphere release valve 41 that opens and closes the flow path. When the atmosphere release valve 41 is opened, the second zone outlet flow path 34 is opened to the atmosphere via the atmosphere release flow path 37.

The first scavenging flow path 38 connects the second zone inlet flow path 33 and the first zone outlet flow path 32. Specifically, the first scavenging flow path 38 connects a portion of the second zone inlet flow path 33 located closer to the second zone 22 than the regulating valve 33*a* and a portion of the first zone outlet flow path 32 located closer to the consumer facility 3 than the outlet valve 32*a*.

The first scavenging flow path 38 is provided with a first scavenging valve 42 that opens and closes the flow path. When the first scavenging valve 42 is opened, the second zone inlet flow path 33 is connected to the consumer facility 3 via the first scavenging flow path 38.

The second scavenging flow path 39 connects the first zone inlet flow path 31 and the first scavenging flow path 38.

Specifically, the second scavenging flow path 39 connects a portion of the first zone inlet flow path 31 located closer to the first zone 21 than the air ejector 31*c* and a portion of the first scavenging flow path 38 located closer to the consumer facility 3 than the first scavenging valve 42.

The second scavenging flow path 39 is provided with a second scavenging valve 43 that opens and closes the flow path. When the second scavenging valve 43 is opened, the first zone inlet flow path 31 is connected to the consumer facility 3 via the first scavenging flow path 38 and the second scavenging flow path 39.

In the present embodiment, the atmosphere release valve 41, the first scavenging valve 42, and the second scavenging valve 43 are configured as electromagnetic valves whose opening and closing are electrically controlled by the control device 50.

The control device 50 includes a storage unit 51 such as a hard disk, an arithmetic processing unit (for example, CPU) 52 that controls the operation of the dryer 4, a known computer including a memory and an input/output device, and software installed in the computer. The arithmetic processing unit 52 drives and controls these devices on the basis of the operation parameters of the motor 5, the atmosphere release valve 41, the first scavenging valve 42, and the second scavenging valve 43 stored in the storage unit 51 during the load operation and the no-load operation of the compressed air supply system 1.

Specifically, when the compressed air supply system 1 is in the load operation state, the arithmetic processing unit 52 controls the motor 5 to rotate at a low speed (for example, 6 rph) and controls the atmosphere release valve 41, the first scavenging valve 42, and the second scavenging valve 43 to close.

On the other hand, when the compressed air supply system is in the no-load operation state, the arithmetic processing unit 52 controls the motor 5 to be stopped, and controls the atmosphere release valve 41, the first scavenging valve 42, and the second scavenging valve 43 to be opened in a predetermined order and closed after a predetermined time has elapsed.

A method for operating the above-described compressed air supply system 1 will be described. First, a method of operating the compressed air supply system 1 in a load operation state will be described with reference to FIG. 1. As described above, in the load operation state, the control device 50 rotates the motor 5 and controls to close the atmosphere release valve 41, the first scavenging valve 42, and the second scavenging valve 43. At this time, as indicated by an arrow in FIG. 1, the compressed air discharged from the compressor 2 is introduced into the first zone inlet flow path 31, cooled by the after cooler 31*b*, and then supplied to the first zone 21 via the air ejector 31*c*.

The compressed air is introduced into the first zone 21 from the bottom portion first connection port 21*b*, passes through the first zone upward in order of the lower first closed space 16*a*, the adsorption rotor 11, and the upper first closed space 15*a*, and is discharged from the lid portion first connection port 21*a* to the first zone outlet flow path 32.

In the first zone 21, moisture in the compressed air is adsorbed by the adsorption medium 13 provided in the adsorption rotor 11, whereby the compressed air is dried. Therefore, the first zone is configured as a treatment zone that adsorbs moisture (also referred to as dehumidifies) from the compressed air. The dry compressed air discharged from the lid portion first connection port 21*a* is supplied to the consumer facility 3 via the first zone outlet flow path 32.

A part of the compressed air discharged from the compressor 2 is diverted from the first zone inlet flow path 31 to the second zone inlet flow path 33. The pressure and amount of the compressed air diverted to the second zone inlet flow path 33 are adjusted by the regulating valve 33*a*, and the compressed air is introduced into the second zone 22 from the lid portion second connection port 22*a*. The compressed air sequentially passes through the upper second closed space 15*b*, the adsorption rotor 11, and the lower second closed space 16*b* downward in the second zone 22, and is discharged from the bottom portion second connection port 22*b* to the second zone outlet flow path 34.

The compressed air supplied to the second zone 22 is not cooled by the after cooler 31*b*, and thus has a higher temperature and a higher dew point than the compressed air supplied to the first zone 21. Therefore, by releasing moisture from the adsorption rotor 11 that has adsorbed a large amount of moisture because moisture has been adsorbed from the compressed air in the first zone 21, the degree of dryness of the adsorption rotor 11 is increased, thereby increasing the amount of moisture that can be adsorbed and regenerating. Therefore, the second zone 22 is configured as a regeneration zone for regenerating the adsorption rotor 11, and the compressed air supplied to the second zone 22 acts as the regeneration gas according to the present invention.

The compressed air discharged from the bottom portion second connection port 22*b* is cooled in the bypass cooler 34*a* via the second zone outlet flow path 34, then reaches the air ejector 31*c*, and is drawn into the first zone inlet flow path 31 from the air ejector 31*c*.

A part of the dry compressed air discharged to the first zone outlet flow path 32 is diverted to the third zone inlet flow path 35 and introduced into the third zone 23 from the lid portion third connection port 23*a*. The dry compressed air sequentially passes through the upper third closed space 15*c*, the adsorption rotor 11, and the lower third closed space 16*c* downward in the third zone 23, and is discharged from the bottom portion third connection port 23*b* to the third zone outlet flow path 36.

Since the dry compressed air supplied to the third zone 23 passes through the after cooler 31*b* and has a decreased temperature, the temperature of the adsorption rotor 11 increased in temperature by the high-temperature regeneration gas in the second zone 22 is decreased, and the adsorption performance by the adsorption medium 13 is improved. Therefore, the third zone 23 is configured as a cooling zone for cooling the adsorption medium 13, and the dry compressed air supplied to the third zone 23 acts as a cooling gas according to the present invention. The dry compressed air supplied to the third zone is dried because moisture is adsorbed by the adsorption rotor 11 in the first zone 21. Therefore, deterioration of drying degree of the adsorption rotor 11 due to cooling is reduced by the dry compressed air in the third zone 23.

The dry compressed air discharged from the bottom portion third connection port 23*b* joins the second zone outlet flow path 34, is cooled in the bypass cooler 34*a*, then reaches the air ejector 31*c*, and is drawn into the first zone inlet flow path 31 via the air ejector 31*c*.

Therefore, in the compressed air supply system 1, during the load operation, the compressed air discharged from the compressor 2 is dried by the dryer 4 and supplied to the consumer facility 3. At this time, in the dryer main body 10, while rotating the adsorption rotor 11, the adsorption of moisture from the compressed air by the adsorption rotor 11 in the first zone 21, the regeneration of the adsorption rotor

11 in the second zone 22, and the cooling of the adsorption rotor 11 in the third zone are performed in parallel.

A part of the compressed air of which moisture has been adsorbed by the adsorption medium 13 of the adsorption rotor 11 in the first zone 21 is supplied to the third zone 23 as a cooling gas. As a result, as compared with a case where compressed air containing a large amount of moisture is supplied to the third zone 23, adhesion of moisture from the compressed air to the adsorption rotor 11 is reduced, so that deterioration of drying performance of the adsorption rotor 11 due to cooling can be reduced. Therefore, it is possible to reduce deterioration of the drying performance of the adsorption rotor 11 and to continuously and stably supply the dry compressed air to the consumer facility 3 side.

Figure 5:
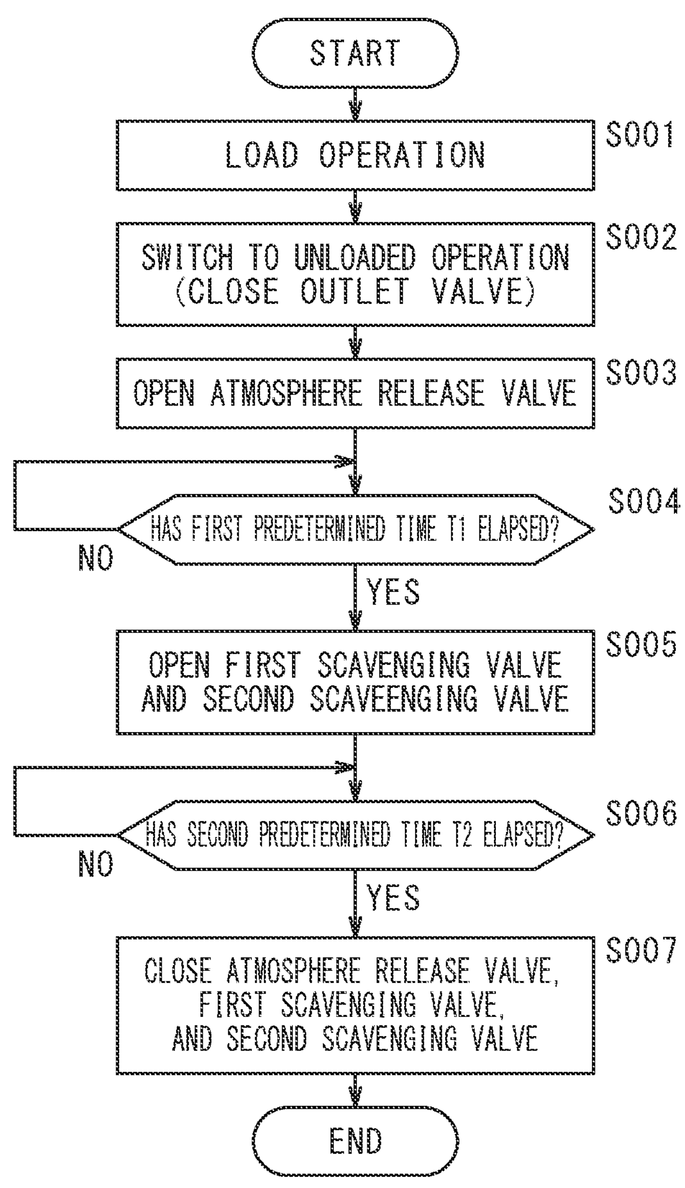
FIG. 5 is a flowchart showing an operation of the compressed air supply system.

Next, a method of operating the compressed air supply system 1 during no-load operation will be described. FIG. 5 is a flowchart illustrating the operation of the compressed air supply system 1 when the load operation state is switched to the no-load operation state. As shown in FIG. 5, initially the compressed air supply system 1 is operating in a load operation (that is, loaded operation) state (step S001). At this time, as illustrated in FIG. 1, the outlet valve 32*a* is opened, and the atmosphere release valve 41, the first scavenging valve 42, and the second scavenging valve 43 are closed.

Next, when the compressed air supply system 1 is in a no-load operation (that is, unloaded operation) state, the outlet valve 32*a* is closed. As a result, the supply of the dry compressed air to the consumer facility 3 side is blocked, and the flow of the compressed air in the compressed air supply system 1 is stopped (step S002). In this state, compressed air is retained in the first zone 21, regeneration gas is retained in the second zone 22, and cooling gas is retained in the third zone 23.

Figure 6:
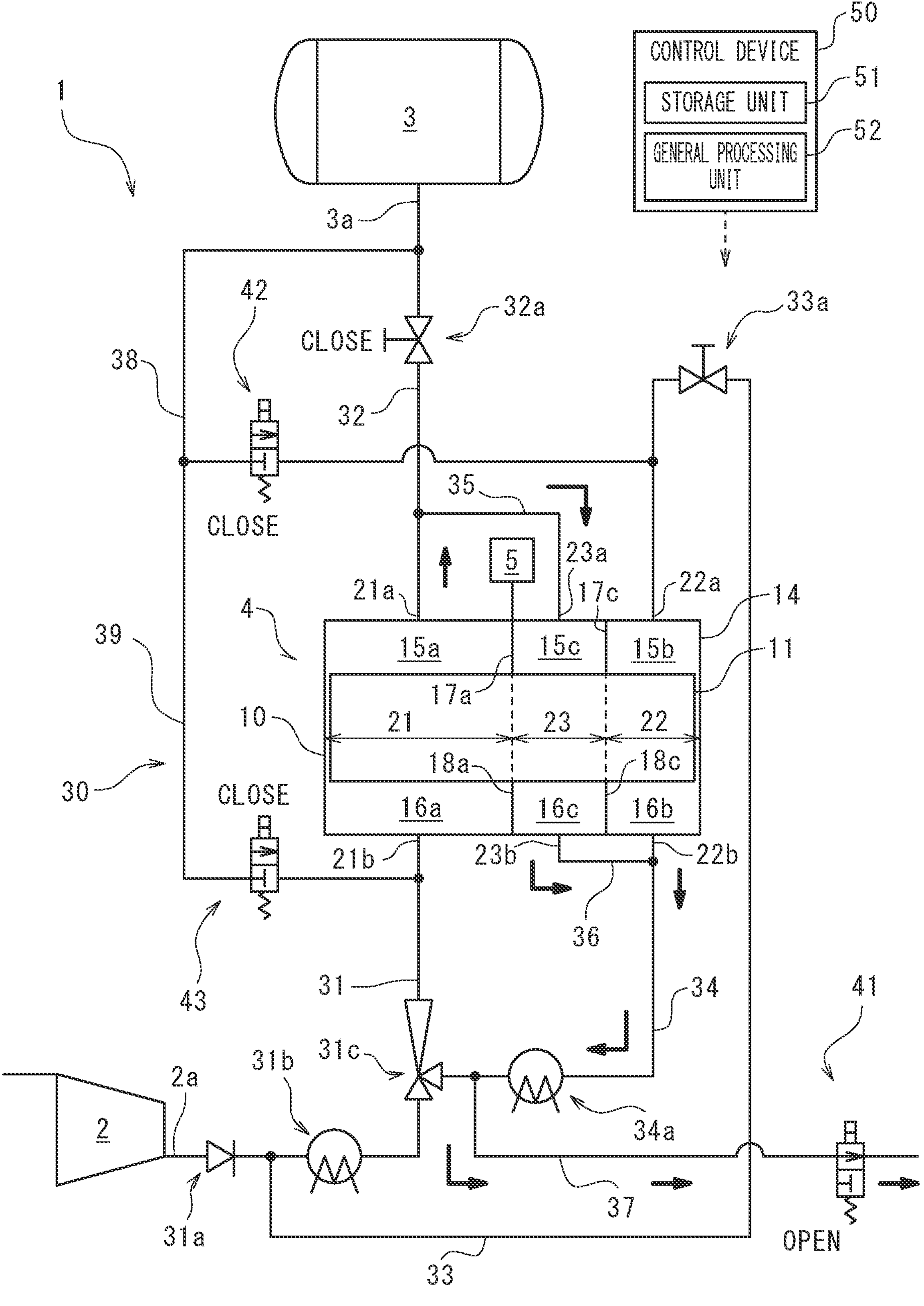
FIG. 6 is a diagram illustrating a flow of compressed air in the compressed air supply system during no-load operation.

Next, the control device 50 (arithmetic processing unit 52) stops the motor 5 and opens the atmosphere release valve 41 (step S003). As a result, as shown in FIG. 6, the second zone 22 and the third zone 23 communicate with the atmosphere via the second zone outlet flow path 34 and the third zone outlet flow path 36, respectively, and further via the atmosphere release flow path 37. Here, the regeneration gas and the cooling gas having a pressure higher than the atmospheric pressure are retained in the second zone 22 and the third zone 23. Therefore, the regeneration gas in the second zone 22 and the cooling gas in the third zone respectively flow into the second zone outlet flow path 34 and the third zone outlet flow path 36 due to a pressure difference from the atmospheric pressure, and some or all of them are released into the atmosphere through the atmosphere release flow path 37.

Furthermore, since the first zone 21 is connected to the third zone 23 via the first zone outlet flow path 32 and the third zone inlet flow path 35, the compressed air in the first zone 21 has a pressure higher than the atmospheric pressure, and is drawn into the third zone 23 with the flow of the cooling gas in the third zone 23. The compressed air drawn into the third zone 23 flows to the second zone outlet flow path 34 and the third zone outlet flow path 36 due to the pressure difference from the atmospheric pressure as described above, and is released into the atmosphere.

Therefore, when the compressed air supply system 1 is in no-load operation, by opening the atmosphere release valve 41, the compressed air, the cooling gas, and the regeneration gas in the casing 14 can be easily discharged from the casing 14 through the atmosphere release flow path 37 using the pressure difference between the internal pressure of the casing 14 and the atmospheric pressure. Specifically, the compressed air retained in the first zone 21 flows to the third zone 23 via the third zone inlet flow path 35, and the compressed air in the third zone 23 and the regeneration gas in the second zone 22 are discharged from the casing 14 to the atmosphere release flow path 37 side.

As a result, leakage of the compressed air retaining in the casing 14, particularly the regeneration gas retained in the second zone 22, to other zones is suppressed, and deterioration of the dew point due to cooling of the compressed air retaining in the casing 14 is reduced, so that supply of the compressed air having the deteriorated dew point to the consumer facility 3 side when switching to the load operation is suppressed.

Next, after the first predetermined time T1 has elapsed since the atmosphere release valve 41 was opened (step S004), the control device 50 opens the first scavenging valve 42 and the second scavenging valve 43 (step S005). The first predetermined time T1 is set to a time required for the compressed air in the first zone 21, the second zone 22, and the third zone 23 to flow due to a pressure difference from the atmospheric pressure, and is set to, for example, 20 seconds in the present embodiment.

Figure 7:
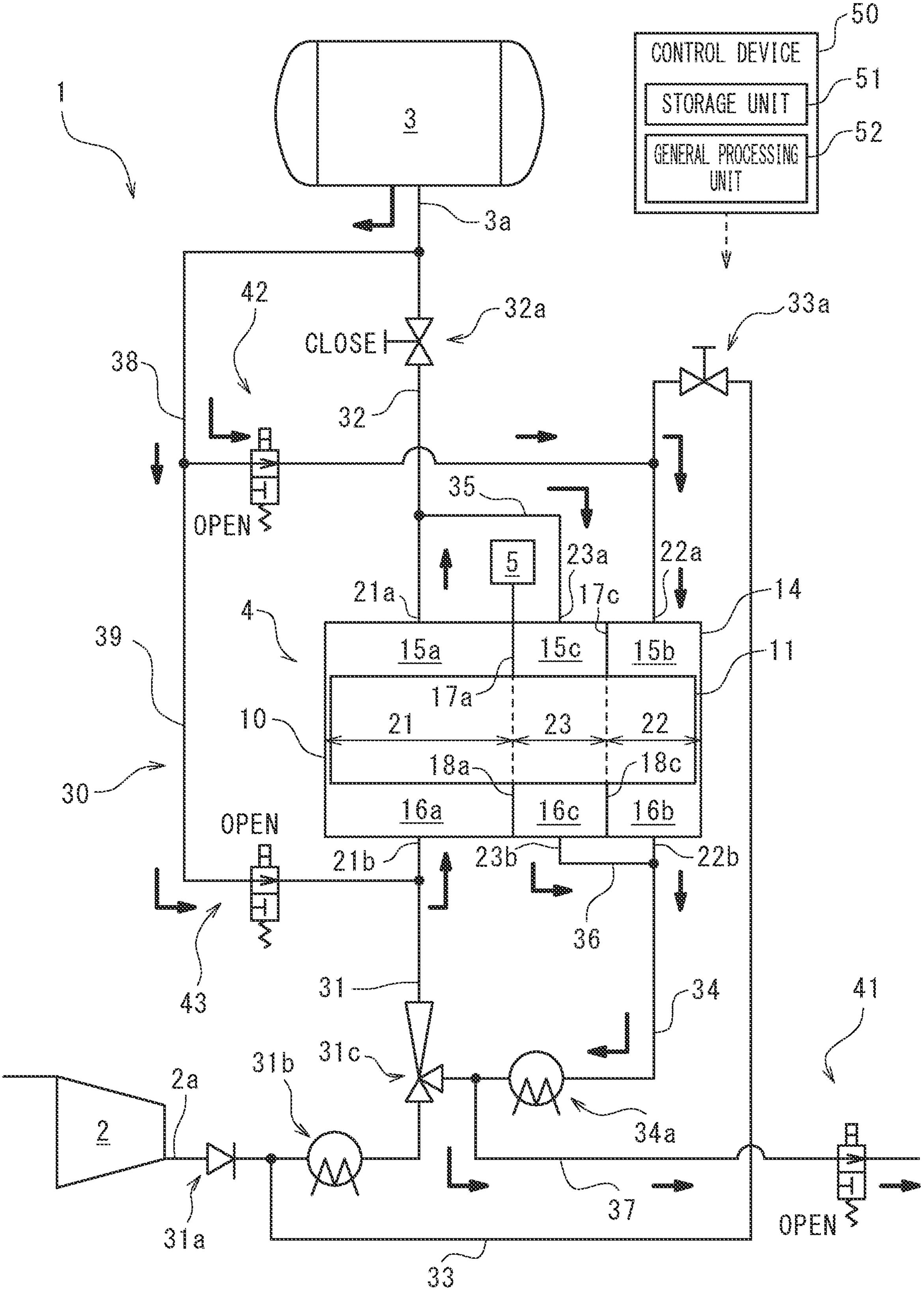
FIG. 7 is a diagram illustrating a flow of compressed air in a compressed air supply system subsequent to FIG. 6.

As shown in FIG. 7, when the first scavenging valve 42 is opened, the second zone inlet flow path 33 and the portion of the first zone outlet flow path 32 located closer to the consumer facility 3 with respect to the outlet valve 32*a* communicate with each other. As described above, since the regeneration gas in the second zone 22 is drawn into the second zone outlet flow path 34, the pressure is lower than the pressure of the dry compressed air in the first zone outlet flow path 32. As a result, dry compressed air is supplied from the consumer facility 3 side to the second zone 22 via the first scavenging flow path 38 and the second zone inlet flow path 33, and the second zone 22 is scavenged by the dry compressed air and finally replaced with dry compressed air.

By opening the first scavenging valve 42 after opening the atmosphere release valve 41, dry compressed air is supplied from the consumer facility 3 side to the second zone 22 from the upstream side via the first scavenging flow path 38, and the regeneration gas can be scavenged from the second zone 22 to replace the second zone with dry compressed air. At this time, the flow of the compressed air in the second zone 22 is directed from the upper side to the lower side as in the load operation.

As a result, the deterioration of the dew point due to the cooling of the regeneration gas retained in the second zone 22 is reduced, so that the adhesion of moisture to the adsorption rotor 11 in the second zone 22 is reduced when the operation is switched to the load operation, and the supply of the compressed air having a deteriorated dew point to the consumer side is reduced.

On the other hand, when the second scavenging valve 43 is opened, the first zone inlet flow path 31 and a portion of the first zone outlet flow path 32 located closer to the consumer facility 3 with respect to the outlet valve 32*a* communicate with each other. As described above, since the compressed air in the first zone 21 is drawn into the third zone 23, the pressure of the compressed air in the first zone 21 is lower than the pressure of the dry compressed air in the first zone outlet flow path 32. As a result, dry compressed air is supplied from the consumer facility 3 side to the first zone 21 via the first zone outlet flow path 32, and the first zone 21 is scavenged by the dry compressed air and is finally replaced with dry compressed air.

The compressed air supplied to the first zone 21 is further supplied to the third zone 23 via the third zone inlet flow path 35, and the third zone 23 is also replaced with dry compressed air.

By opening the second scavenging valve 43 after opening the atmosphere release valve 41, dry compressed air is supplied from the consumer facility 3 side to the first zone 21 via the first scavenging flow path 38 and the second scavenging flow path 39 from the upstream side, and can sequentially scavenge the first zone 21 and the third zone 23 to replace the first zone 21 and the third zone 23 with dry compressed air. At this time, the flow of the compressed air in the first zone 21 is directed from the lower side to the upper side as in the load operation, and the flow of the compressed air in the third zone 23 is directed from the upper side to the lower side as in the load operation.

As a result, deterioration of the dew point due to cooling of the compressed air retained in the first zone 21 and the third zone 23 is reduced, so that adhesion of moisture to the adsorption rotor 11 in the first zone 21 and the third zone 23 is reduced when the operation is switched to the load operation, and supply of the compressed air having a deteriorated dew point to the consumer facility 3 side is suppressed.

Next, after the second predetermined time T2 has elapsed since the first scavenging valve 42 and the second scavenging valve 43 were opened (step S006), the control device 50 closes the atmosphere release valve 41, the first scavenging valve 42, and the second scavenging valve 43 (step S007). As a result, the first zone 21, the second zone 22, and the third zone 23 are replaced with dry compressed air, and the scavenging by the supply of dry compressed air from the consumer facility 3 side is terminated.

The second predetermined time T2 is preferably set to a time during which the first zone 21, the second zone 22, and the third zone 23 are completely replaced with dry compressed air, and is set to, for example, 40 seconds in the present embodiment.

Therefore, according to the compressed air supply system 1 according to the embodiment described above, it is possible to reduce deterioration of the drying performance of the adsorption rotor 11 by using the dry compressed air as the cooling gas in the third zone 23 during the load operation. On the other hand, at the time of no-load operation, compressed air retained in the casing 14 is discharged and replaced with dry compressed air, thereby achieving an effect of suppressing supply of compressed air with a deteriorated dew point to the consumer facility 3 side when switching to load operation is performed.

In addition to the above embodiment, a pressurization device 60 may be provided in the first zone inlet flow path 31 as indicated by a two-dot chain line in FIG. 1 to increase the pressure of the compressed air flowing through the first zone inlet flow path 31.

According to the pressurization device 60, the pressure of the compressed air in the first zone 21 can be increased more than the pressure of the regeneration gas in the second zone 22, whereby the leakage of the regeneration gas in the second zone 22 into the first zone 21 in the upper closed space 15 and the lower closed space 16 of the adsorption rotor 11 in the casing 14 is suppressed. As a result, deterioration of drying performance due to leakage of the regeneration gas containing a large amount of moisture into the first zone 21 can be reduced.

Figure 8:
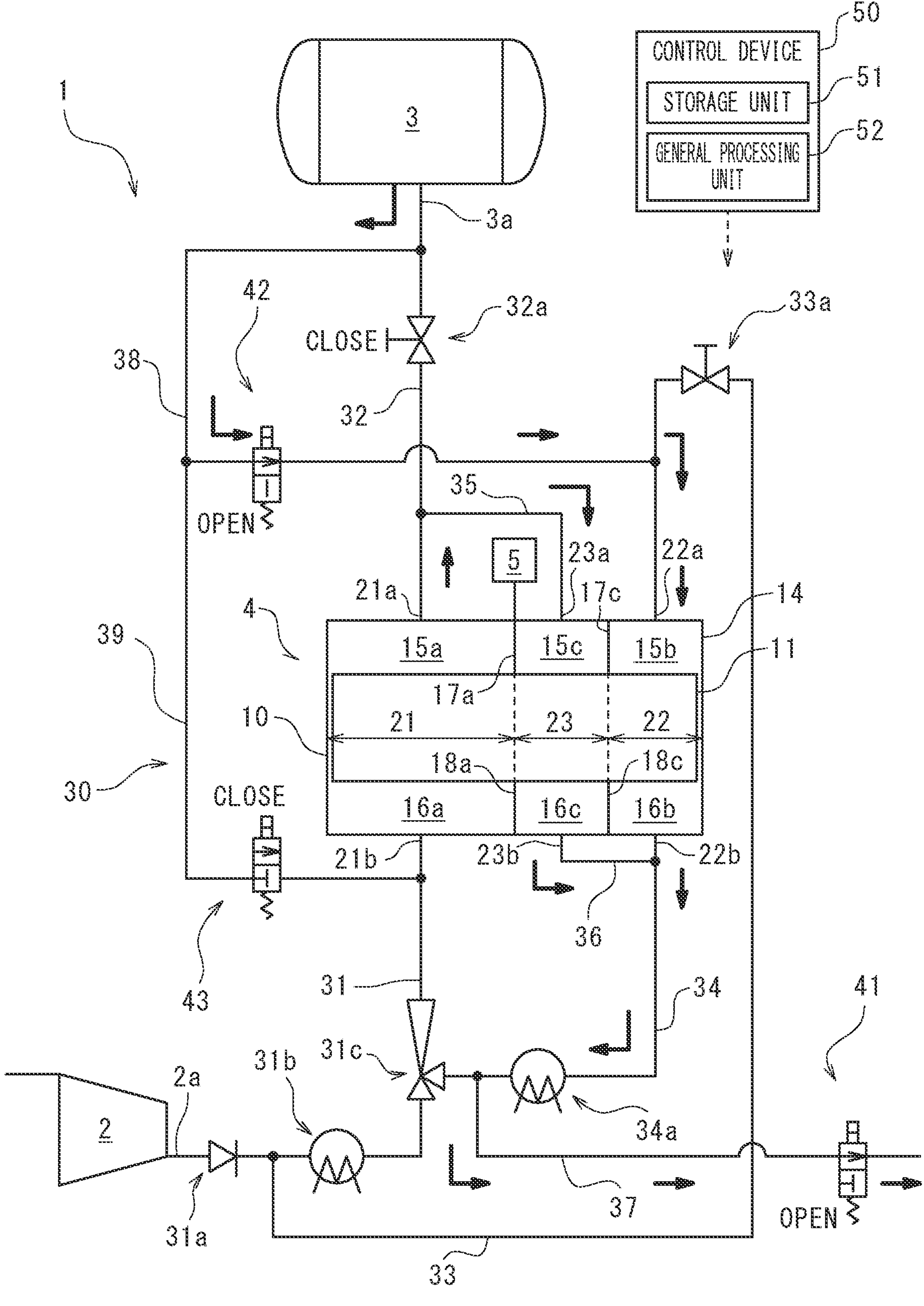
FIG. 8 is a view similar to FIG. 7 according to a modification.
Figure 9:
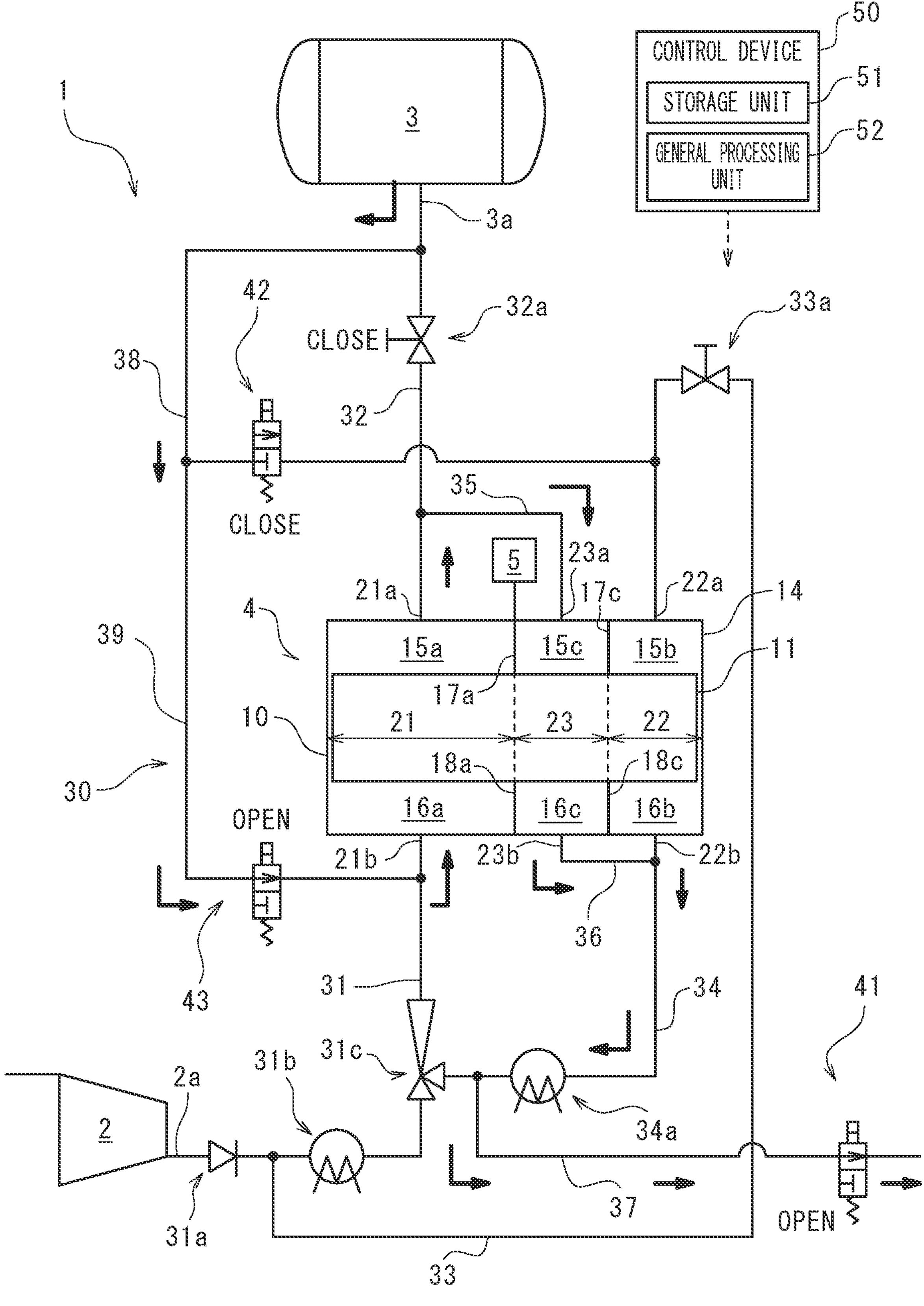
FIG. 9 is a view similar to FIG. 7 according to another modification.

In the above embodiment, the case where both the first scavenging valve 42 and the second scavenging valve 43 are opened after the first predetermined time T1 has elapsed since the opening of the atmosphere release valve 41 during the no-load operation has been described as an example, but the present invention is not limited thereto. For example, only the first scavenging valve 42 may be opened as illustrated in FIG. 8, or only the second scavenging valve 43 may be opened as illustrated in FIG. 9. The first scavenging valve 42 and/or the second scavenging valve 43 may be opened simultaneously with the opening of the atmosphere release valve 41.

Although not illustrated, each of the after cooler 31*b* and the bypass cooler 34*a* includes a drain portion for discharging moisture generated by heat exchange. Each drain unit includes a drain valve whose opening and closing are operated by the control device 50. Although the drain valve is normally closed, the control device 50 controls the drain valve to be periodically opened and closed during the load operation, and maintains the closed state after opening the drain valve only once during the no-load operation.

In the above embodiment, the motor 5 is stopped during the no-load operation; however, the present invention is not limited thereto, and the motor 5 may be rotated during the no-load operation. However, since the flow of the compressed air is stopped during the no-load operation, the adsorption of moisture from the compressed air, the regeneration of the adsorption rotor 11, and the cooling of the adsorption rotor 11 cannot be performed. Therefore, it is preferable to stop the rotation of the motor 5 from the viewpoint of preventing the air retained in each zone from flowing into other zones.

Figure 10:
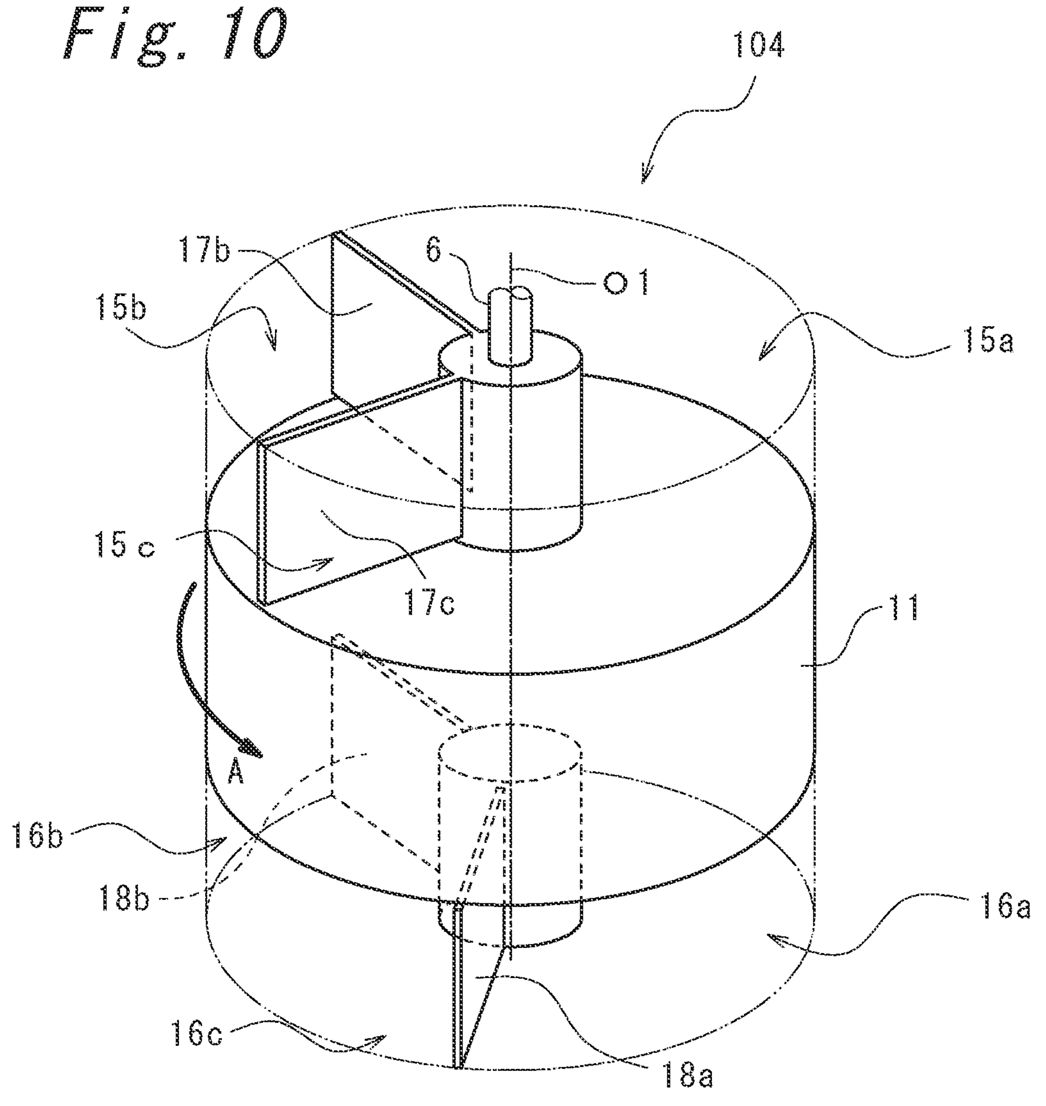
FIG. 10 is a view similar to FIG. 4, showing an adsorption dryer according to another embodiment.
Figure 11:
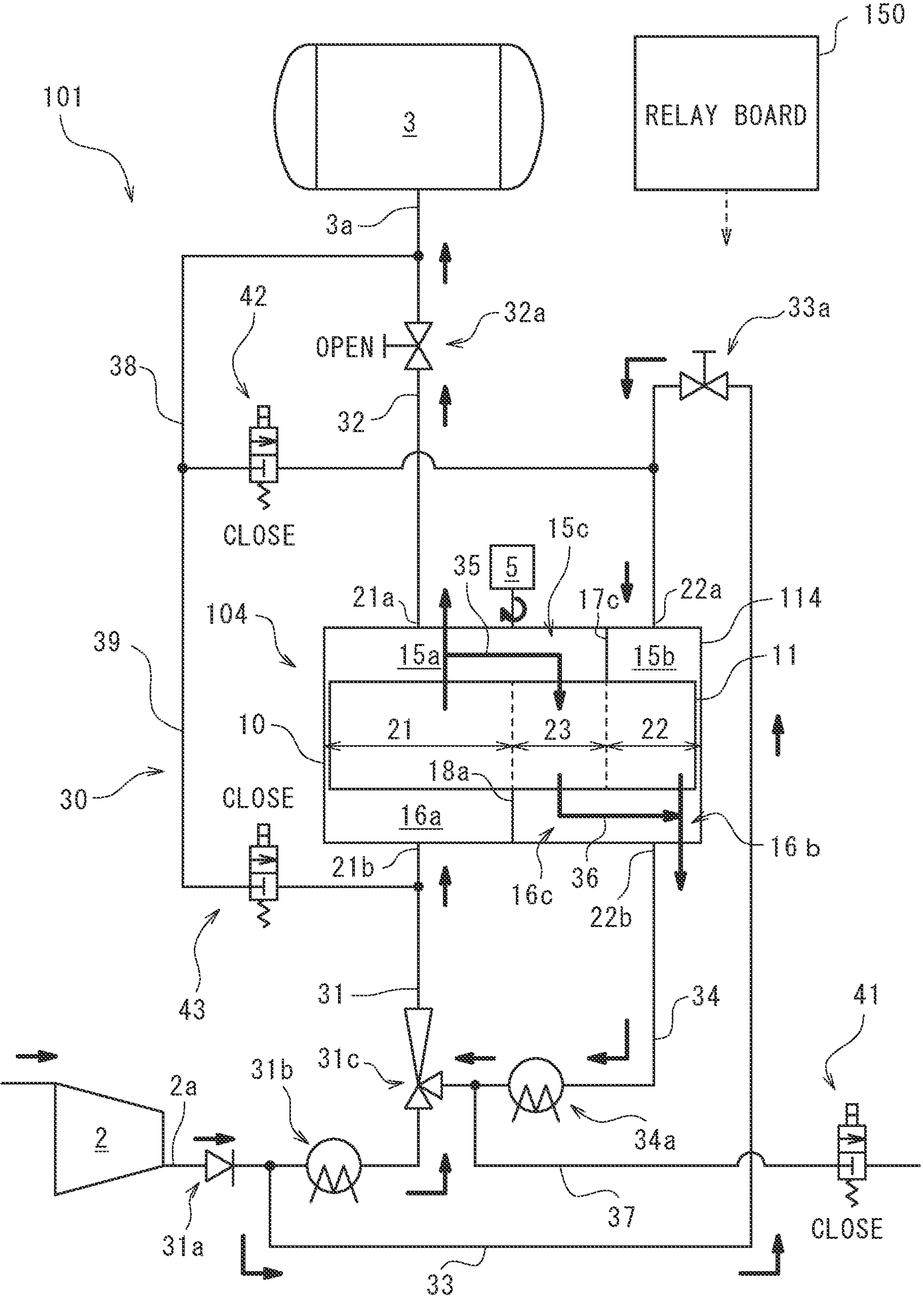
FIG. 11 is a configuration diagram schematically showing a compressed air supply system including the adsorption dryer of FIG. 10.

FIG. 10 is a perspective view schematically showing a flow path in a casing 114 (see FIG. 11) of an adsorption dryer 104 according to another embodiment, and FIG. 11 is a configuration view schematically showing a compressed air supply system 101 according to another embodiment including the dryer 104. The same reference numerals are used for parts common to the compressed air supply system 1, and the description thereof will be omitted.

As shown in FIG. 10, the dryer 104 is different from the dryer 4 in that it has the second partition wall 17*b* and the third partition wall 17*c* that partition the upper closed space 15, but does not have the first partition wall 17*a*. Therefore, in the upper closed space 15, the upper second closed space 15*b* is defined between the second partition wall 17*b* and the third partition wall 17*c* in the rotation direction A, and the upper first closed space 15*a* and the upper third closed space 15*c* are integrally defined between the third partition wall 17*c* and the second partition wall 17*b* in the rotation direction A. In other words, the upper first closed space 15*a* and the upper third closed space 15*c* are not separated from each other and communicate with each other.

On the other hand, the dryer 104 is different from the dryer 4 in including the first partition wall 18*a* and the second partition wall 18*b* that partition the lower closed space 16, but not including the third partition wall 18*c*. Therefore, in the lower closed space 16, the lower first closed space 16*a* is defined between the first partition wall 18*a* and the second partition wall 18*b* in the rotation direction A, and the lower second closed space 16*b* and the lower third closed space 16*c* are integrally defined between the second partition wall 18*b* and the first partition wall 18*a* in the rotation direction A. In other words, the lower second closed space 16*b* and the lower third closed space 16*c* are not separated from each other and communicate with each other.

As shown in FIG. 11, the dryer 104 is different from the casing 114 in that the casing 14 is not provided with a lid portion third connection port 23*a* and a bottom portion third connection port 23*b*. In another embodiment, the third zone inlet flow path 35 is configured as a flow path from the upper first closed space 15*a* toward the upper third closed space 15*c* in the upper closed space 15 of the casing 114. The third zone outlet flow path 36 is configured as a flow path from the lower third closed space 16*c* toward the lower second closed space 16*b* in the lower closed space 16 of the casing 114.

Further, the dryer 104 includes a relay board 150 instead of the control device 50. The relay board 150 includes a plurality of relays (not illustrated), and controls the operations of the motor 5, the atmosphere release valve 41, the first scavenging valve 42, and the second scavenging valve 43 in a predetermined order by the plurality of relays as in the previous embodiment.

A flow of compressed air in the dryer 104 will be described. The flow of compressed air in the first zone 21 and the second zone 22 is similar to that in the previous embodiment. On the other hand, in the third zone 23, a part of the compressed air that passes upward through the adsorption rotor 11 in the first zone and is discharged to the upper first closed space 15*a* is directly diverted to the upper third closed space 15*c*, and flows downward through the adsorption rotor 11 in the third zone 23 to reach the lower third closed space 16*c*. Since the lower third closed space 16*c* is connected to the lower second closed space 16*b*, the compressed air discharged to the lower third closed space 16*c* is discharged to the second zone outlet flow path 34 via the lower second closed space 16*b*.

Therefore, also in the dryer 104, a part of the dry compressed air of which moisture has been adsorbed by the adsorption rotor 11 in the first zone 21 is supplied to the third zone 23 as the cooling gas. The cooling gas that has cooled the adsorption rotor 11 in the third zone 23 joins with the regeneration gas that has regenerated the adsorption rotor 11 in the second zone 22, and is discharged from the casing 114 via the second zone outlet flow path 34.

Therefore, according to another embodiment, the dryer 104 can be configured with a simpler configuration as compared with the previous embodiment.

Although specific embodiments of the present invention have been described above, the present invention is not limited to the above embodiments, and various modifications can be made within the scope of the present invention.

The invention claimed is:

1. An adsorption dryer comprising:

a rotary adsorption rotor that is formed in a columnar shape, has a plurality of rotor flow paths penetrating in an axial direction, and includes an adsorption medium on a wall surface constituting each of the plurality of rotor flow paths;

a casing that is formed in a cylindrical shape, rotatably supports the adsorption rotor concentrically accommodated, and has an inside partitioned about a central axis into a treatment zone, a regeneration zone, and a cooling zone, each extending in an axial direction;

a treatment zone inlet flow path for supplying compressed air to the treatment zone;

a treatment zone outlet flow path for supplying the compressed air having flowed through the rotor flow path of the treatment zone to a consumer side;

a cooling zone inlet flow path for supplying to the cooling zone a cooling gas for cooling the adsorption rotor;

a cooling zone outlet flow path for discharging the cooling gas having flowed through the rotor flow path in the cooling zone;

a regeneration zone inlet flow path for supplying regeneration gas for regenerating the adsorption rotor to the regeneration zone;

a regeneration zone outlet flow path for discharging the regeneration gas that has flowed through the rotor flow path in the regeneration zone from the casing;

an outlet valve that is provided in the treatment zone outlet flow path and opens and closes the treatment zone outlet flow path; and a check valve that is provided in the treatment zone inlet flow path, and allows a flow of compressed air only in a direction toward the treatment zone via the treatment zone inlet flow path, wherein the cooling zone inlet flow path supplies a part of the compressed air having flowed through the rotor flow path of the treatment zone as the cooling gas, the regeneration zone inlet flow path has a one end portion branched from a portion of the treatment zone inlet flow path located closer to the treatment zone with respect to the check valve, the regeneration zone outlet flow path joins a portion of the treatment zone inlet flow path located closer to the treatment zone with respect to the one end portion of the regeneration zone inlet flow path, the cooling gas having flowed through the cooling zone joins the regeneration gas having flowed through the regeneration zone, an atmosphere release flow path is connected to the regeneration zone outlet flow path on a side closer to one end portion joining the treatment zone inlet flow path with respect to a position where the cooling gas joins the regeneration zone outlet flow path, and the atmosphere release flow path is provided in the middle thereof with an atmosphere release valve that has a distal end opened to the atmosphere, and that opens and closes the atmosphere release flow path.

2. The adsorption dryer according to claim 1, further comprising:

a first scavenging flow path connecting a portion of the treatment zone outlet flow path located closer to the consumer side with respect to the outlet valve and the regeneration zone inlet flow path; and a first scavenging valve that is provided in the first scavenging flow path and opens and closes the first scavenging flow path.

3. The adsorption dryer according to claim 1, further comprising:

a scavenging flow path connecting a portion of the treatment zone outlet flow path located closer to the consumer side with respect to the outlet valve and the treatment zone inlet flow path; and a scavenging valve that is provided in the scavenging flow path and opens and closes the scavenging flow path.

4. The adsorption dryer according to claim 1, further comprising a pressurization device that is provided in the treatment zone inlet flow path and pressurizes the compressed air flowing through the treatment zone inlet flow path.

5. A method for operating an adsorption dryer that dries compressed air compressed by a compressor and supplies the compressed air to a consumer side, the method comprising:

during load operation of the compressor, while rotating an adsorption rotor concentrically in a cylindrical casing having a treatment zone, a cooling zone, and a regeneration zone that are circumferentially partitioned, carrying out in parallel:

adsorbing, in the treatment zone, moisture from the compressed air supplied in an axial direction by a portion of the adsorption rotor located in the treatment zone and supplying compressed air to a consumer side;

cooling, in the cooling zone, a portion of the adsorption rotor located in the cooling zone by a cooling gas supplied in the axial direction; and regenerating, in the regeneration zone, a portion of the adsorption rotor located in the regeneration zone by regeneration gas supplied in the axial direction, supplying a part of the compressed air of which moisture has been adsorbed by the adsorption rotor in the treatment zone to the cooling zone as the cooling gas, during no-load operation of the compressor, blocking the supply of the dried compressed air to the consumer side by an outlet valve and releasing the cooling gas discharged from the cooling zone and the regeneration gas discharged from the regeneration zone to the atmosphere, and simultaneously with or after the blocking, performing at least one of supplying the dried compressed air from the consumer side with respect to the outlet valve to an upstream side of the treatment zone and supplying the dried compressed air from the consumer side with respect to the outlet valve to an upstream side of the regeneration zone.

* * * * *